United States Patent
Keesara et al.

(10) Patent No.: US 8,830,998 B2
(45) Date of Patent: Sep. 9, 2014

(54) SEPARATION OF EDGE AND ROUTING/CONTROL INFORMATION FOR MULTICAST OVER SHORTEST PATH BRIDGING

(75) Inventors: Srikanth Keesara, Tewksbury, MA (US); Gautam Khera, Walpole, MA (US); Rama Apalla, Nashua, NH (US)

(73) Assignee: Avaya Inc., Basking Ridge, NJ (US)

( * ) Notice: Subject to any disclaimer, the term of this patent is extended or adjusted under 35 U.S.C. 154(b) by 216 days.

(21) Appl. No.: 13/242,422

(22) Filed: Sep. 23, 2011

(65) Prior Publication Data
US 2013/0077626 A1  Mar. 28, 2013

(51) Int. Cl.
*H04L 12/28* (2006.01)

(52) U.S. Cl.
USPC ......................................................... 370/390

(58) Field of Classification Search
CPC . H04L 12/4625; H04L 45/66; H04L 12/4633; H04L 12/4641; H04L 45/04; H04L 45/00; H04L 45/12; H04L 45/48; H04L 45/02; H04L 45/16; H04L 45/24; H04L 45/22; H04L 12/462; H04L 12/4662; H04L 49/351; H04L 12/18; H04L 45/50; H04L 45/72; H04L 45/745; H04L 12/185; H04L 49/354; H04L 49/60; H04L 61/103; H04L 12/4658; H04L 12/56; H04L 45/123; H04L 45/44

See application file for complete search history.

(56) References Cited

U.S. PATENT DOCUMENTS

| | | | |
|---|---|---|---|
| 2006/0221975 A1* | 10/2006 | Lo et al. ...................... | 370/395.5 |
| 2007/0165657 A1* | 7/2007 | Smith et al. .................. | 370/401 |
| 2010/0165884 A1* | 7/2010 | Farkas et al. ................. | 370/256 |
| 2012/0082146 A1* | 4/2012 | Andreasen et al. ........... | 370/338 |

* cited by examiner

*Primary Examiner* — Chi Pham
*Assistant Examiner* — Raul Rivas
(74) *Attorney, Agent, or Firm* — Anderson Gorecki & Rouille LLP

(57) ABSTRACT

Techniques disclosed herein include systems and methods for providing a scalable solution to transmit edge IP Multicast sender information in a Shortest Path Bridging (SPB) network. Control information is exchanged between Ingress Backbone Edge Bridges and Egress Backbone Edge Bridges Such control messages do not cause path computations at Backbone Core Bridges within the SPB network. Such exchanges of control messages trigger sending SPB specific Intermediate System To Intermediate System (IS-IS) TLV control message with path computation information via IS-IS control messages. This second set of control messages is exchanged within the SPB network and includes source-specific multicast stream information that is used by Backbone Core Bridges to establish a multicast forward state and compute multicast forwarding paths. By separating edge and routing information, IP multicasting functionality within the SPB is provided while enabling scaling and new edge multicasting applications.

18 Claims, 7 Drawing Sheets

SEPARATION OF EDGE AND ROUTING/CONTROL INFORMATION FOR MULTICAST OVER SHORTEST PATH BRIDGING

BACKGROUND

The present disclosure relates to network computing. Computer networks typically include a collection of computing devices enabled to communicate with each other for handling data traffic and control instructions. For example, such devices can include servers, data centers, routers, network switches, management applications, wireless access points, and client computers. Computer networks can provide network connectivity to wired computing devices and/or wireless computing devices.

One type of network technology is known as Shortest Path Bridging (SPB). A set of standards for implementing Shortest Path Bridging is generally specified by the Institute of Electrical and Electronics Engineers (IEEE). Specifically, this standard is identified as IEEE 802.1aq. Network services, including SPB services are commonly provided using Ethernet technology. Ethernet has become a default Data Link Layer technology for data transport, that is, the default for Layer 2 (L2) of the Open Systems Interconnection (OSI) model. SPB can expand Ethernet technologies to other or larger networks. For example, a network that uses IEEE 802.1aq SPB can advertise both topology and logical network membership. SPB uses a link state protocol for such advertising.

In an SPB network, packets are encapsulated at an edge node either in Mac-in-Mac 802.1ah or Q-in-Q 802.1ad frames and transported only to other members of the logical network. IEEE 802.1aq supports unicast and multicast, and all routing is on symmetric shortest paths. IEEE 802.1aq includes Shortest Path Bridging MAC (SPBM) functionality. There exist other related technologies that follow the model of a provider network (transport network) that connects two or more customer networks (access networks), where the provider network is functionally distinct from the customer network, even if a single administrator runs both networks.

For example, one technology is Provider Backbone Bridges (PBB) technology. A PBB network is a L2-Bridged network that uses Mac-In-Mac encapsulation to transfer user L2 traffic between two or more L2 networks that are located at the edge of the PBB network (provider network). Note that a PBB network includes all networks that use Mac-In-Mac encapsulation technology, including, but not limited to, networks that use the Shortest Path Bridging Technology commonly referred to as SPB or SPBV or SPBM. The PBB network typically includes a Backbone Edge Bridge (BEB) and a Backbone Core Bridge (BCB). BEBs (also known as provider network edge nodes) function as devices that enable transfer of packets to/from interfaces within the PBB network and to/from interfaces outside the PBB network. BCBs (also known as provider core nodes) enable transfer of packets between interfaces that are within the PBB network. Sender BEBs are also known as Ingress BEBs, while receiver BEBs are also known as Egress BEBs.

A network protocol related to SPB is known as Intermediate System To Intermediate System (IS-IS). IS-IS is a routing protocol that routes data by determining a best route for datagrams transmitted through a packet-switched network. The IS-IS protocol is published by Internet Engineering Task Force (IETF) as an Internet Standard in RFC 1142, as well as in International Organization for Standardization (ISO)/International Electrotechnical Commission (IEC) 10589: 2002. SPB Networks can use IS-IS as a control protocol and type-length-value (TLV) structures for control messaging. A TLV structure allows optional information to be encoded within a given packet.

SUMMARY

Shortest Path Bridging (SPB) technology is a component of Virtual Enterprise Network Architecture (VENA). SPB uses Intermediate System To Intermediate System (IS-IS) as a control protocol to transfer routing information between devices in the SPB Network. One possible enhancement to the SPB specification is support for Internet Protocol (IP) Multicast Traffic over an SPB network. Specifically, this enhancement involves using type-length-value (TLV) structures that identify IPv4/IPv6 multicast sources and groups, and that can be used with IS-IS in an SPB Network. Enhancements to the SPB specification refer to these TLV structures as "Mutlicast Flow Specific TLVs."

Multicast Flow Specific TLVs enable exchange of information, regarding a multicast flow or resource, between devices that can transmit the multicast flow into the network (Ingress BEBs) and devices that want/need to receive the multicast flow (Egress BEBs). This exchange of information conveys several items of information from each Ingress BEB that can send a multicast flow. One item is a Virtual Local Area Network Identifier (VLAN-ID). Other information includes IP source address and IP destination address, as well as a flow identifier. This information can also be used when sending packets corresponding to the multicast flow into the network.

For the SPB Network to deliver the multicast flow to all Egress BEBs that need to receive the multicast stream, each device (edge and core devices) in the SPB Network needs to compute a forwarding record for the (VLAN-ID, IP destination address, and IP source address). Unfortunately, this computation is problematic because this computation would require logic within all the devices in the SPB Network to (1) parse the "Multicast Flow Specific TLVs" to find out the VLAN-ID, Media Access Control (MAC) information used for the multicast stream, and (2) compute forwarding records for the VLAN-ID and MAC address information. Requiring such logic within all devices—including core nodes—is expensive, time consuming, and not always possible to implement. Moreover, such Multicast Flow Specific TLV structures could be very specific to the multicast flows being signaled, and are likely to evolve over time. For example, IPv4 and IPv6 may use different TLV structures. Additionally, mask values may be specified for the Source IP address portion of a multicast stream. It is also possible that some of these Multicast Flow Specific TLV structures could be proprietary and may only be understood by a handful of BEBs from a single vendor signaling them.

As a consequence, a given SPB network that might consist of standards compliant implementations from multiple vendors might not be able to build the required forwarding records using the Multicast Flow Specific TLVs. This may even be true if the network is capable of relaying these TLVs using standard IS-IS Link State Database (LSDB) propagation rules.

Any conventional implementation that attempts to use Multicast Flow Specific TLVs would have at least a couple of consequences. One problem is required upgrades to all core devices in the SPB network, if new kinds of multicast flow intelligence is to be added at the edge. Another problem is that such a conventional implementation would limit the protocol used to signal multicast flows to being just the IS-IS protocol, which could be a limiting factor in certain highly-scaled multicast environments and with IPv6.

What is needed, therefore, is a technique of using TLVs for signaling available multicast network resources, but that is not tied undesirably to the semantics of a multicast flow at the edge of the network requiring core nodes to compute forwarding records.

Techniques disclosed herein provide a multiple part scalable solution to transmit edge IP Multicast sender information. In one part, techniques include exchanging information between Ingress BEBs and Egress BEBs using Multicast Flow Specific TLVs, such as described above. Multicast Flow Specific TLVs are also known as Stream Info TLVs. This information can also be exchanged with other control protocols, such as Border Gateway Protocol (BGP.) In a second part, techniques disclosed herein can use certain SPB-specific IS-IS TLVs and path computation rules that enable the SPB network to deliver packets with the (VLAN-ID, Multicast-DA) to be delivered from the Ingress BEB that sends these packets into the SPB network, to the Egress BEBs that desire (or request) to receive these packets. In a third part, a system implements mechanisms on an Ingress BEB that allow the Ingress BEB to send IS-IS-SPB specific TLVs (described above) with a transmission (TX) bit set in an I-SID portion of the TLV for the multicast flow. This implementation is in addition to engaging in Ingress BEB and Egress BEB Multicast Flow Specific TLVs.

Implementation mechanisms on an Egress BEB allow the Egress BEB to send SPB specific IS-IS TLVs with the receiver (RX) bit set in an I-SID portion of the TLV. This can be implemented using control message exchanges, which results in Egress BEBs learning about the existence of one or more multicast streams, as well as learning the (VLAN, Multicast Address) that each Egress BEB should use to request and receive the stream. By triggering separate TLV exchanges as a result of having completed Multicast Flow (Stream Info) TLV exchanges, the system is able to avoid having to use Multicast Flow Specific TLVs for path computations within the SPB Network. Such techniques provide several advantages. Transport devices that are not required to support the termination of the multicast flows do not need to understand the semantics of the "Multicast Flow Specific TLVs." Instead, transport devices (typically core nodes) merely need to propagate that control information using standard IS-IS rules. This allows intelligence to be added at the edge without having to modify the core. Another advantage with such techniques is that a system can use a protocol other than IS-IS to exchange information conveyed by "Multicast Flow Specific TLVs," if this information becomes too large to be carried by IS-IS. For example, Border Gateway Protocol (BGP) control messaging can be used to convey or announce multicast streams, while IS-IS control messaging is used for path computation within the SPB network.

One embodiment includes a multicast manager that executes a multicast routing process and/or system as a Layer 2 service within a Shortest Path Bridging (SPB) network. The multicast manager receives a first control message at a first data switching device. The first data switching device functions as a Backbone Edge Bridge within a transport network, such as an egress BEB. This transport network uses Shortest Path Bridging protocol. The first control message originates from (sent by) a second data switching device. This second data switching device functions as a second Backbone Edge Bridge within the transport network, such as ingress BEB. The first control message indicates that the second data switching device is a transmitter node for a multicast data stream, with the multicast data stream identified using an Internet Protocol (IP) Source Address, an IP Destination Address, a Virtual Local Area Network identifier, and a Data Service Instance Identifier (Data I-SID).

In response to identifying that the first data switching device is a receiver node for the Data I-SID, the multicast manager generates a second control message that indicates that the first data switching device is a receiver node for the multicast data stream. This is identified using both the Data I-SID and a nickname of the second data switching device. The second control message is a different type of control message as compared to the first control message. This can include two different types of IS-IS control messages, or the second control message being an IS-IS TLV, while the first control message uses a different control protocol. The second control message is structured such that a Backbone Core Bridge within the transport network uses the second control message for computing a multicast path (or paths) within the transport network. The first data switching device can then transmit the second control message to the second data switching device via the transport network. The first data switching device can also then receive data packets corresponding to the multicast data stream.

Yet other embodiments herein include software programs to perform the steps and operations summarized above and disclosed in detail below. One such embodiment comprises a computer program product that has a computer-storage medium (e.g., a non-transitory, tangible, computer-readable media, disparately located or commonly located storage media, computer storage media or medium, etc.) including computer program logic encoded thereon that, when performed in a computerized device having a processor and corresponding memory, programs the processor to perform (or causes the processor to perform) the operations disclosed herein. Such arrangements are typically provided as software, firmware, microcode, code data (e.g., data structures), etc., arranged or encoded on a computer readable storage medium such as an optical medium (e.g., CD-ROM), floppy disk, hard disk, one or more ROM or RAM or PROM chips, an Application Specific Integrated Circuit (ASIC), a field-programmable gate array (FPGA), and so on. The software or firmware or other such configurations can be installed onto a computerized device to cause the computerized device to perform the techniques explained herein.

Accordingly, one particular embodiment of the present disclosure is directed to a computer program product that includes one or more non-transitory computer storage media having instructions stored thereon for supporting operations such as: receiving a first control message at a first data switching device, the first data switching device functioning as a first Backbone Edge Bridge within a transport network using Shortest Path Bridging protocol, the first control message originating from a second data switching device, the second data switching device functioning as a second Backbone Edge Bridge within the transport network, the first control message indicating that the second data switching device is a transmitter node for a multicast data stream, the multicast data stream identified using an Internet Protocol (IP) Source Address, an IP Destination Address, a Virtual Local Area Network identifier, and a Data Service Instance Identifier (Data I-SID); in response to identifying that the first data switching device is a receiver node for the Data I-SID, generating a second control message indicating that the first data switching device is a receiver node for the multicast data stream identified using both the Data I-SID and a nickname of the second data switching device, the second control message being a different type of control message as compared to the first control message, the second control message structured such that a Backbone Core Bridge within the transport network uses the second control message for computing a multicast path within the transport network; transmitting the second control message to the second data switching device via the transport network; and receiving, at the first data switching device, data packets corresponding to the multicast data stream. The instructions, and method as described herein, when carried out by a processor of a respective computer device, cause the processor to perform the methods disclosed herein.

Other embodiments of the present disclosure include software programs to perform any of the method embodiment steps and operations summarized above and disclosed in detail below.

Of course, the order of discussion of the different steps as described herein has been presented for clarity sake. In general, these steps can be performed in any suitable order.

Also, it is to be understood that each of the systems, methods, apparatuses, etc. herein can be embodied strictly as a software program, as a hybrid of software and hardware, or as hardware alone such as within a processor, or within an operating system or within a software application, or via a non-software application such a person performing all or part of the operations. Example embodiments as described herein may be implemented in products and/or software applications such as those manufactured by Avaya, Inc. of Lincroft, N.J.

As discussed above, techniques herein are well suited for use in software applications supporting SPB multicast routing and associated operations. It should be noted, however, that embodiments herein are not limited to use in such applications and that the techniques discussed herein are well suited for other applications as well. Additionally, although each of the different features, techniques, configurations, etc. herein may be discussed in different places of this disclosure, it is intended that each of the concepts can be executed independently of each other or in combination with each other. Accordingly, the present invention can be embodied and viewed in many different ways.

Note that this summary section herein does not specify every embodiment and/or incrementally novel aspect of the present disclosure or claimed invention. Instead, this summary only provides a preliminary discussion of different embodiments and corresponding points of novelty over conventional techniques. For additional details and/or possible perspectives of the invention and embodiments, the reader is directed to the Detailed Description section and corresponding figures of the present disclosure as further discussed below.

BRIEF DESCRIPTION OF THE DRAWINGS

The foregoing and other objects, features, and advantages of the invention will be apparent from the following more particular description of preferred embodiments herein as illustrated in the accompanying drawings in which like reference characters refer to the same parts throughout the different views. The drawings are not necessarily to scale, with emphasis instead being placed upon illustrating the embodiments, principles and concepts.

DETAILED DESCRIPTION

Figure 1:
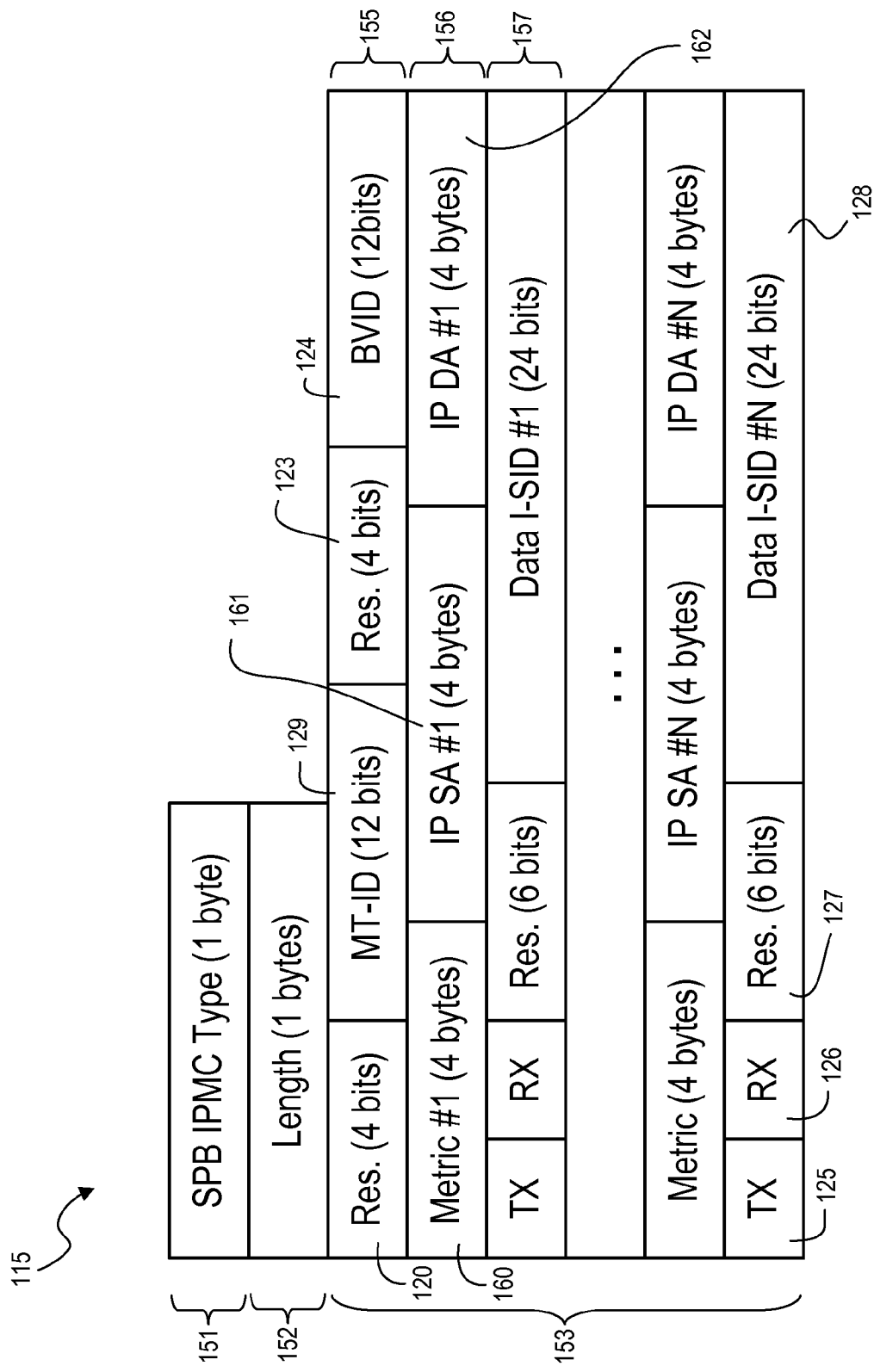
FIG. 1 is a diagram of an SPB-MAC IP Multicast (Stream-Info) TLV according to embodiments herein.

Techniques disclosed herein include systems and methods that provide a scalable solution to transmit edge IP Multicast sender information in a Shortest Path Bridging (SPB) network. In one part, techniques include exchanging information between Ingress BEBs and Egress BEBs using Multicast Flow Specific TLVs, such as described above. Multicast Flow Specific TLVs are also known as Stream Info TLVs. This information can also be exchanged with other control protocols, such as Border Gateway Protocol (BGP.) In a second part, techniques disclosed herein can use certain IS-IS-SPB specific TLVs and path computation rules that enable the SPB network to deliver packets with the (VLAN-ID, Multicast-DA) to be delivered from the Ingress BEB that sends these packets into the SPB network, to the Egress BEBs that desire (or request) to receive these packets. IS-IS-SPB specific TLVs and path computation rules are described in more detail in U.S. patent application Ser. No. 13/242,250 filed on Sep. 23, 2011 which is published as U.S. Patent Application Publication Number 2013/0077625, and titled: "Extension Of The Interpretation And Definition Of The IS-IS TLV/Sub-TLV," the disclosure of which is herein incorporated by reference in its entirety. In a third part, a system implements mechanisms on an Ingress BEB that allow the Ingress BEB to send IS-IS-SPB specific TLVs (described above) with a transmission (TX) bit set in an I-SID portion of the TLV for the multicast flow. This implementation is in addition to engaging in Ingress BEB and Egress BEB Multicast Flow Specific TLVs.

Implementation mechanisms on an Egress BEB allow the Egress BEB to send SPB specific IS-IS TLVs with the receiver (RX) bit set in an I-SID portion of the TLV. This can be implemented using control message exchanges, which results in Egress BEBs learning about the existence of one or more multicast streams, as well as learning the (VLAN, Multicast Address) that each Egress BEB should use to request and receive the stream. By triggering separate TLV exchanges as a result of having completed Multicast Flow (Stream Info) TLV exchanges, the system is able to avoid having to use Multicast Flow Specific TLVs for path computations within the SPB Network. Such techniques provide several advantages. Transport devices that are not required to support the termination of the multicast flows do not need to understand the semantics of the "Multicast Flow Specific TLVs." Instead, transport devices (typically core nodes) merely need to propagate that control information using standard IS-IS rules. This allows intelligence to be added at the edge without having to modify the core. Another advantage with such techniques is that a system can use a protocol other than IS-IS to exchange information conveyed by "Multicast Flow Specific TLVs," if this information becomes too large to be carried by IS-IS. For example, Border Gateway Protocol (BGP) control messaging can be used to convey or announce multicast streams, while IS-IS control messaging is used for path computation within the SPB network.

Referring now to FIG. 1, FIG. 1 is a representation of an SPB-Mac IP Multicast (Stream Info) TLV, also called a Multicast Flow Specific TLV 115. In general this graphical representation includes a type portion 151, a length portion 152, and a value portion 153. The type portion or type field indicates how the subsequent data and/or data fields should be interpreted. The type field can indicate that this is a Multicast Flow Specific TLV, which triggers corresponding interpretation at network nodes. The value portion includes section 155 having reserved field 120, multi-topology identification field 129, reserved field 123, and Backbone Virtual Local Area Network identifier (BVID) field 124. Section 156 includes a metric field 160, and IP source address field 161, and an IP destination address field 162. Section 157 includes a transmitter bit 125, a receiver bit 126, reserved field 127, and Data I-SID 128. This is a top-level TLV that can be used for routing of IP multicasting. The "Stream Info" includes a metric, IP source address, IP group destination address, and Data I-SID. The BVID can be used for multicast streams.

A given IP multicast source coming from an access network will have an IP source address, an IP destination address (S,G), and will be allocated a Data I-SID. The Data I-SID will be used for multicasting. With transmit and receive bits included in TLV 115, BCBs that receive TLV 115 can then interpret these bits to decide how to compute forwarding trees. Unfortunately, section 156 of TLV 115 can either grow in size or change in the structure of information—which could be dependent on different applications. For example, for executing IPv6, the IPv6 source address and destination address are much larger quantities relative to IPv4, yet the core devices would still need to construct a tree for a given data I-SID interpreting the significantly greater amount of information. Such interpretation can become burdensome for the core devices, especially with content that can change over time, or get enhanced in the future.

In contrast, techniques disclosed herein do not interpret the Tx and Rx bits in TLV 115 (or equivalent control message). Instead, the core devices merely convey this information from one edge node to another edge node (from one side of the network to another) using IS-IS, BGP, or another suitable protocol that core nodes do not need to interpret. Instead, only the edge devices interpret this information. TLV 115 can convey information between the edge devices as to what sender information is available and where it is located.

Figure 3:
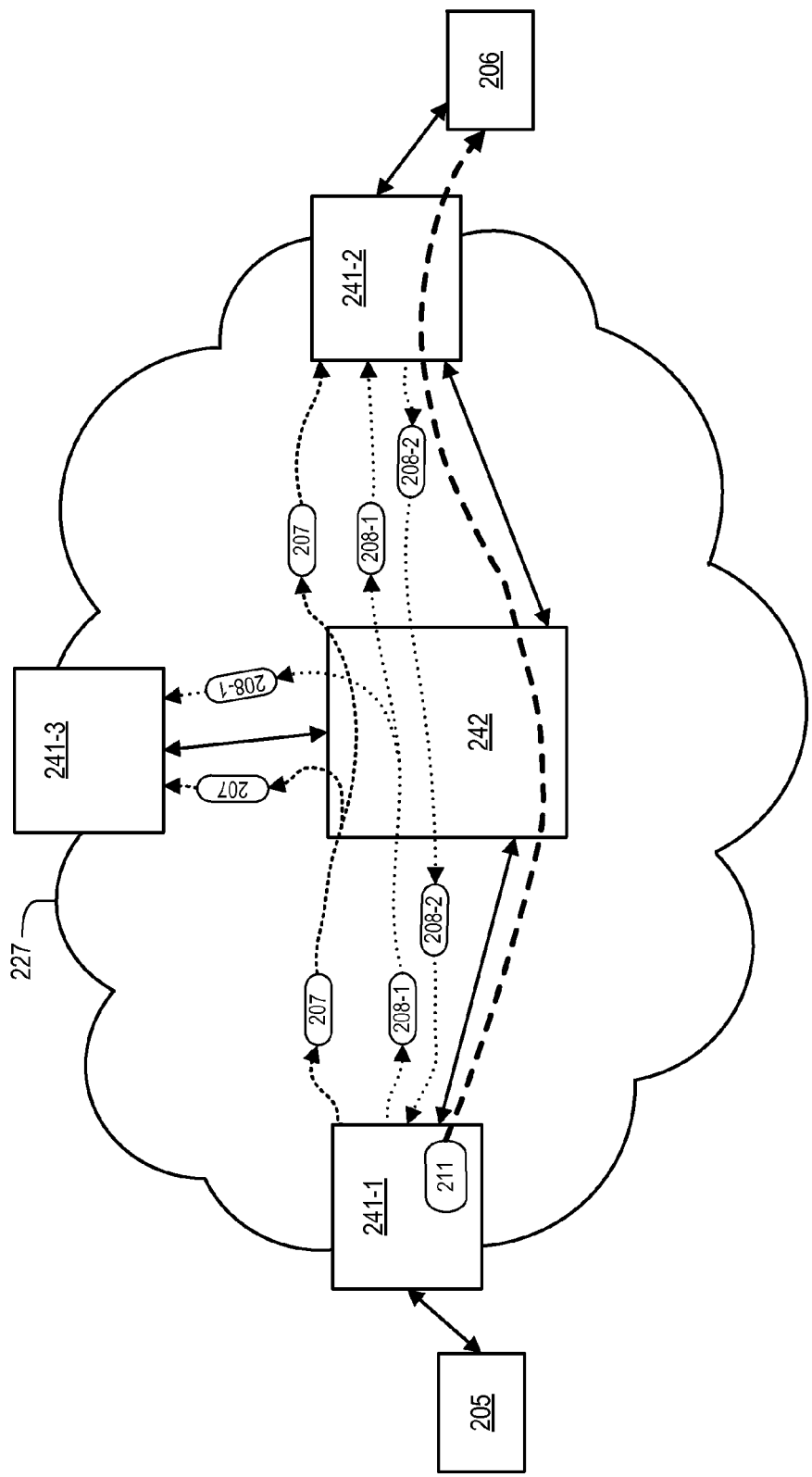
FIG. 3 is a block diagram of an SPB network providing multicast state creation and separation of control/routing according to embodiments herein.

Referring now to FIG. 3, a network diagram illustrates this process. FIG. 3 illustrates example control messaging and interpretation using a simplified model of an SPB network 227. SPB network 227 includes Backbone Edge Bridges 241-1, 241-2, and 241-3, and Backbone Core Bridge 242. In this example, there is an IP multicast source 205 located logically outside the SPB network, such as within (or attached to) an access network. IP multicast Receiver 206 is also located outside of the SPB network, and signals a request to BEB 241-2 to receive the IP multicast source. BEB 241-1 records the IP multicast source available, and assigns a local Data I-SID 211. BEB 241-2 also records that attached receiver 206 would like to receive that IP multicast.

BEB 241-1 can then signal to edges nodes in network 227 that this multicast resource is available at BEB 241-1. This announcement can be signaled using control message 207 structured using a Multicast Flow Specific TLV 115. Accordingly, BEBs 241-2 and 241-3 both receive control message 207, and thus the multicast source (a source and group, along with a data I-SID) as been announced to the BEBs within the SPB network. In some embodiments there may be a cost or metric included to assist in determining efficient data paths. Conveying control message 207 via IS-IS means that this control message will be seen by the backbone core bridges also because all nodes within an SPB network see IS-IS control messages as specified by the IS-IS protocol. Although BCB 242 sees control message 207, BCB 242 does not need to use this information to interpret enclosed information or compute any path information. Instead, BCB 242 simply relays this information.

Note that a given TLV can carry information for multiple different data streams, and for each data stream there is a different data I-SID allocated. In practice, the core only needs information from section 157 for path computation. If, however, the core node always had to interpret field 156, then this interpretation would result in undesirable consequences. For example, every time a new edge switch is added, such as to implement IPv6 instead of Ipv4, all nodes would need to be updated. It is not desirable to update all nodes within the network at once. It is preferable to be able to upgrade a portion of the nodes without upgrading an entire SPB network, and to update edge nodes without needing to update core nodes.

Figure 2:
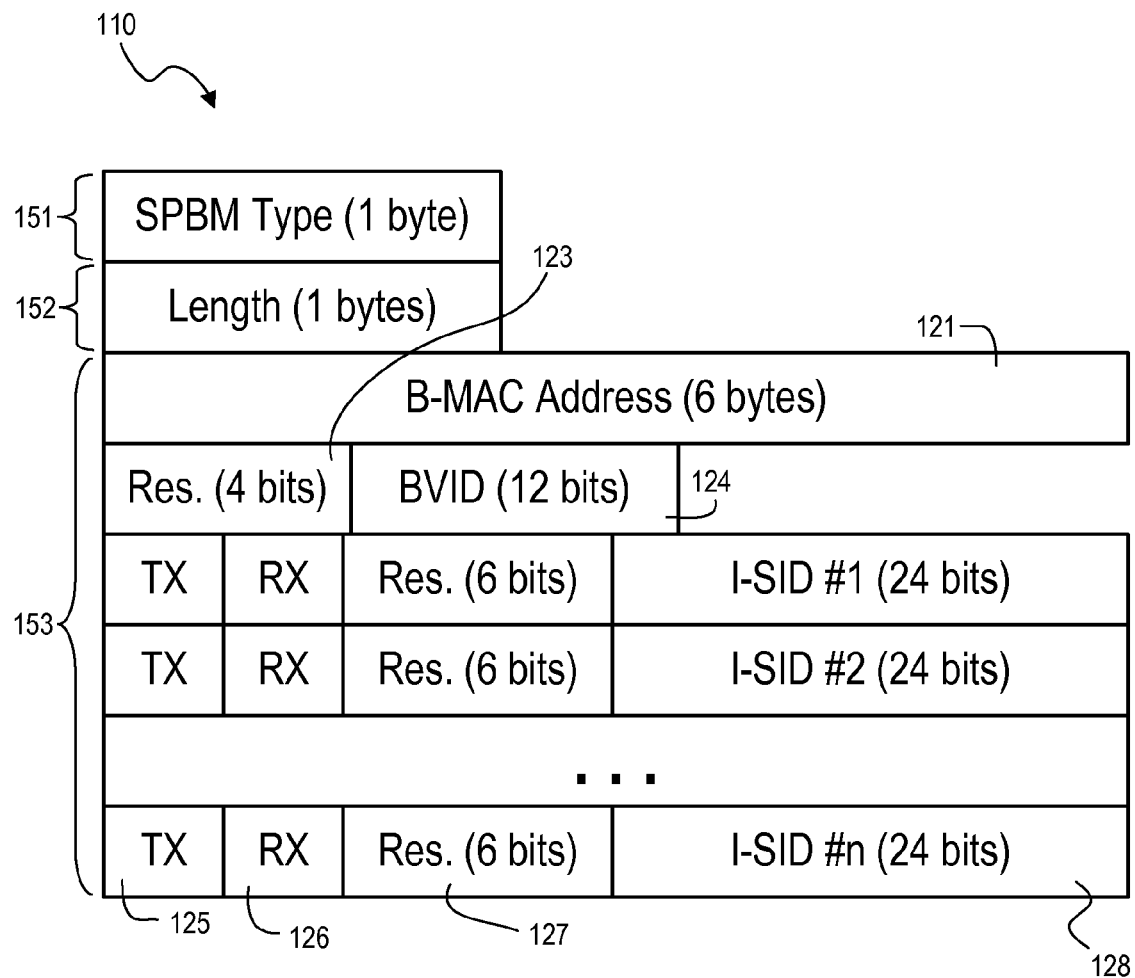
FIG. 2 is a diagram of an SPB-MAC Service Identifier and Unicast Address Sub-TLV used with IS-IS according to embodiments herein.

While the system can use TLV 115 to convey information from edge to edge, the system uses a different TLV to signal the core to perform new routing operations. One such different TLV is an IS-IS TLV, such as SPB-MAC Service Identifier and Unicast Address Sub-TLV 110 illustrated in FIG. 2. In general this graphical representation includes a type portion 151, a length portion 152, and a value portion 153. In TLV 110, the first value field 121 is a B-MAC address field spanning 6 bytes, a reserved field of 4 bits 123, and Backbone VLAN identifier field 124. The B-MAC address field 121 can be used to signal that a message is either unicast or multicast. For IP multicast, however, a multicast B-MAC address is used, and can be followed by one or more I-SID fields. I-SID fields can include a transmitter bit 125, and receiver bit 126, reserved bits 127, and I-SID 128 of 24 bits. The various I-SID fields can include different I-SIDs that a given BEB is advertising. Within a given I-SID field, there are two subfields for transmit and receive information. For IP multicast, however, typically either the transmit bit is set or the receive bit is set, but not both.

When TLV 110 indicates that it is a multicast message, nodes within network 227 interpret such control messages and create source-specific link state information. For example, in response to a multicast address, a given node—including core nodes—computes a forwarding state based on the top 24 bits of the multicast address from the B-MAC-DA, and the lower 24 bits (I-SID), and joins or links these two items of information. Thus, the present disclosure can reuse the existing TLV, or sub-TLV, structures by creatively interpreting the MAC address field. Thus, when a B-MAC address field identifies itself as multicast, then the B-MAC address field is interpreted differently. Note that each node within the SPB network receives the same control plane information and thus executes this computation. This computation can include computing a path from a sender to a receiver based on a graph or topology of the network. By having the same view of senders and receivers, nodes within the transport network can use IS-IS to compute paths. Thus, with a multicast TLV address, and associated interpretation changes, each node only computes a state of the one sender specified, instead of all nodes linked to a given I-SID. Such techniques are described in more detail in U.S. Patent Application Publication Number 2013/0077625 "Extension Of The Interpretation And Definition Of The IS-IS TLV/Sub-TLV."

Continuing with FIG. 3, BEB 241-1 uses IS-IS control message 208-1 to signal to network 227 that BEB 241-1 is a transmitter for data I-SID 211. Core nodes use control message 208-1 to update a link state database and create forwarding tables. After receiving control message 207, and before (or after) receiving control message 208-1, BEB 241-2 identifies itself as a receiver for the announced data I-SID and creates IS-IS control message 208-2 and transmits this within the network 227. Control message 208-2 requests data I-SID 211 by identifying both I-SID 211 and a nickname of BEB 241-1. With the network 227 having received both control messages 208-1 and 208-2, multicast data stream 211 can be forwarded via efficient paths created within network 227. Thus, control message 207 triggers BEB 241-2 to create separate control message 208-2.

Note that each TLV can be sitting in or a part of a same control message, yet they are logically separate TLV's. In other words, each TLV can be isolated by type within a given control message communication envelope. Moreover, a given network node is only required to interpret the TLV types that it understands. Accordingly, a given core node can recognize that the core node cannot understand a particular TLV, and so the core node does not interpret it. Notwithstanding, the core node relays such TLV to other nodes within the network. Standardized IS-IS rules instruct nodes to relay control information across the network regardless of whether a particular node can interpret that information. Thus, apart from relaying control message 207, this TLV does not put any additional burden on the core nodes.

As a matter of principled computing, when a core node in an SPB network is required to interpret control messages, then it is preferable to use a standardized procedure. Thus, there exists a certain portion of operating network standards that require computing a forwarding state, while new functionality on new devices can still be used within an existing SPB network. In other words, techniques disclosed herein separate multicast control information to specifically identify what core nodes need to interpret and execute. As such, core nodes are configured to interpret only those TLVs that are not changing with the addition of new services or new devices. With such a technique, other protocols can be used to carry information from edge to edge, such as OSPF and BGP instead of—or in addition to—IS-IS. Thus, new functionality can be added to one or more edge nodes without having to upgrade the core nodes. Without requiring the core nodes to interpret expanding and changing IP multicast source and group information, the core nodes only need to know which BEB is sending on a data I-SID, and which BEBs are receiving on that data I-SID.

Thus, the first control message or first set of control messages are used between edge nodes to announce IP multicast streams, and then a second type of control message or set of control messages are used to request that the core nodes build a multicast forwarding state. In some embodiments, the first message can be a point-to-point message completely outside of IS-IS to announce a data I-SID for a particular stream. Thus, core nodes will not build a forwarding state until receiving TLVs 110 (control messages 208). Once a pair of edge nodes identifies a specific I-SID being used, then they can both send TLV 110 to signal the core to create a forwarding state. Thus the first control message establishes edge to edge information for control streams (an association between a flow and a data I-SID), and the second TLV requests a forwarding state to be built.

Figure 6:
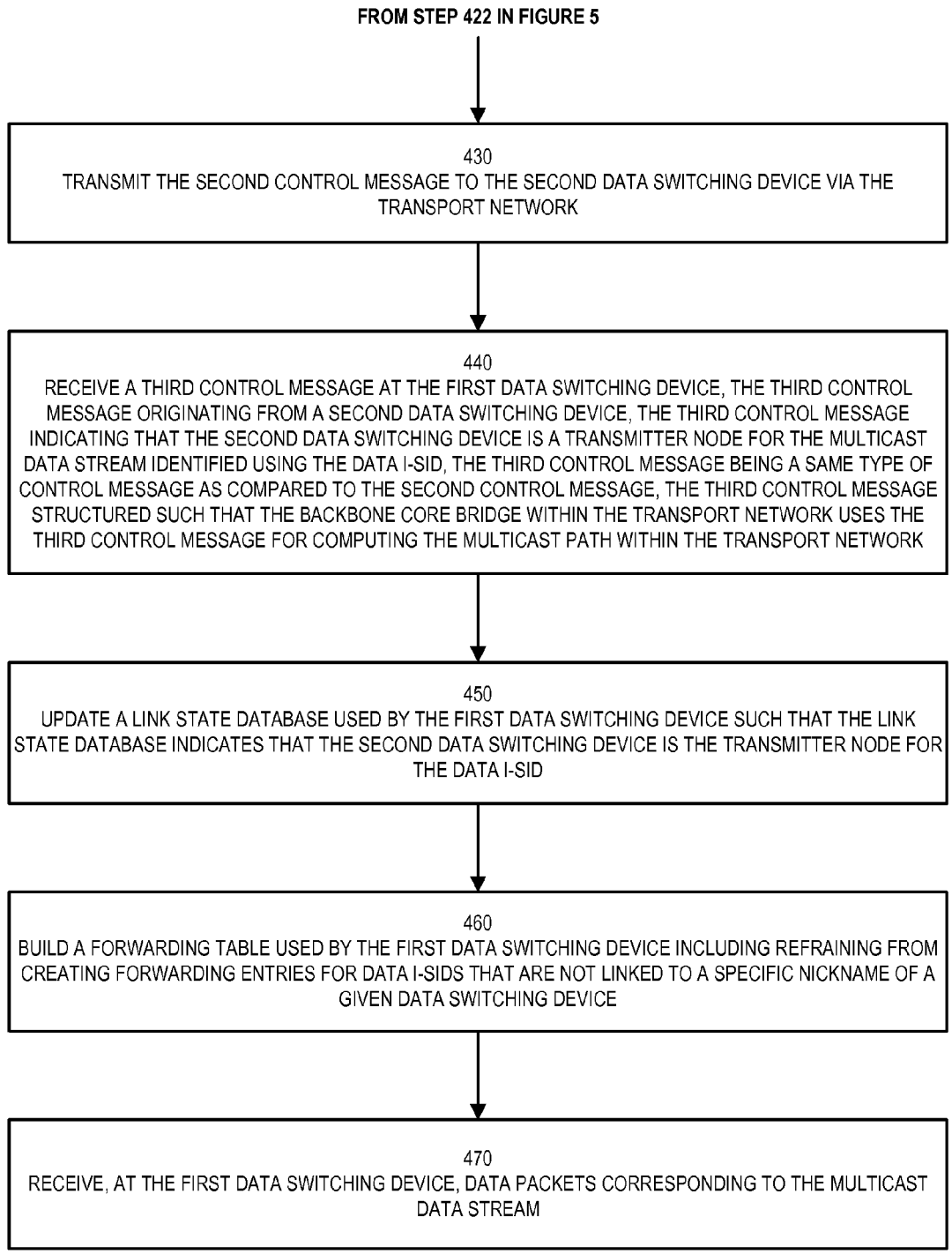
Figure 7:
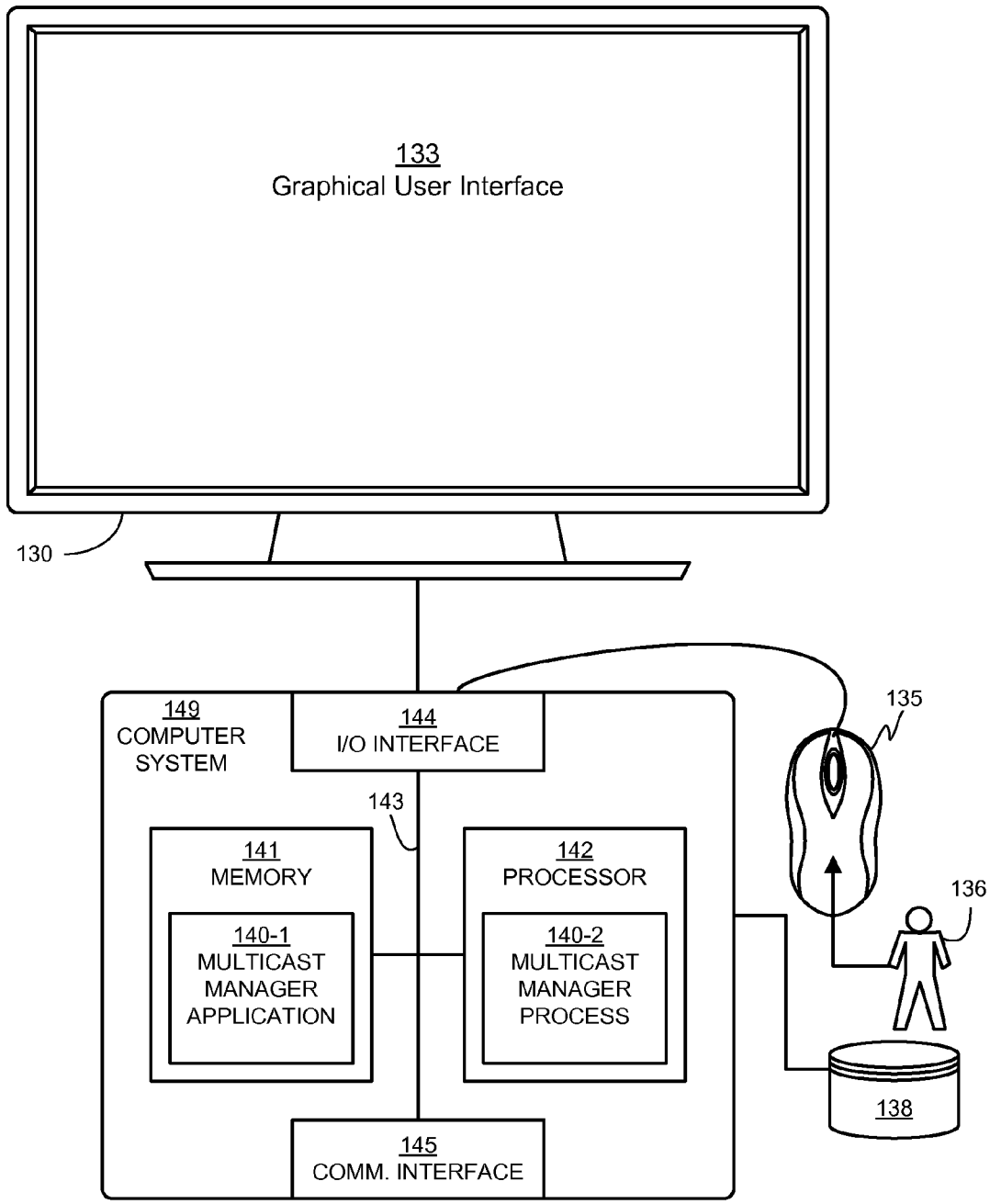
FIG. 7 is an example block diagram of a multicast manager operating in a computer/network environment according to embodiments herein.

FIG. 7 illustrates an example block diagram of a multicast manager 140 operating in a computer/network environment according to embodiments herein. Computer system hardware aspects of FIG. 7 will be described in more detail following a description of the flow charts. Functionality associated with multicast manager 140 will now be discussed via flowcharts and diagrams in FIG. 4 through FIG. 6. For purposes of the following discussion, the multicast manager 140 or other appropriate entity performs steps in the flowcharts.

Figure 4:
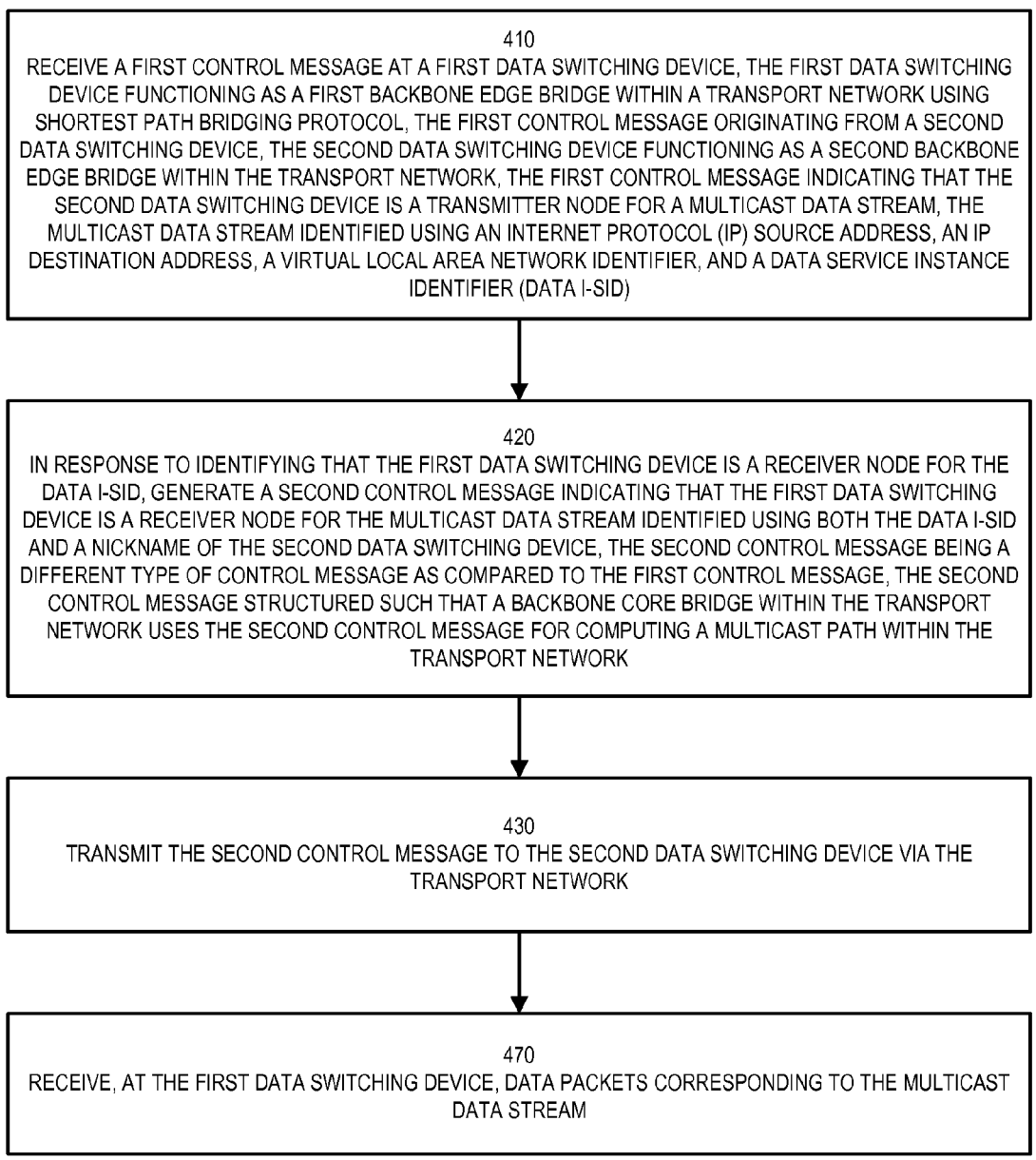
FIG. 4 is a flowchart illustrating an example of a process supporting multicast state creation in an SPB network according to embodiments herein.

Now describing embodiments more specifically, FIG. 4 is a flow chart illustrating embodiments disclosed herein. In step 410, multicast manager 140 receives a first control message at a first data switching device, such as messages sent on the control plane instead of the forwarding plane. The first data switching device is functioning as a first Backbone Edge Bridge within a transport network, and this transport network uses Shortest Path Bridging protocol for forwarding operations. The first control message originates from a second data switching device. This second data switching device functions as a second Backbone Edge Bridge within the transport network. The first control message indicates that the second data switching device is a transmitter node for a multicast data stream. This multicast data stream is identified using an Internet Protocol (IP) Source Address, an IP Destination Address, a Virtual Local Area Network identifier, and a Data Service Instance Identifier (Data I-SID). Indicating that the second data switching device is a transmitter node for a multicast data stream can be explicit or implicit. For example, a transmitter (Tx) bit can be set to indicate this. Alternatively, the control message is selected of a specific type in which BEBs always interpret the message as a transmission announcement of available multicast data stream sources. The multicast data stream refers to an available network resource that can be transmitted in a sequence over time, such as by transmitting a sequence of data packets, and/or the actual sequence of data packets being transmitted.

In step 420, in response to identifying that the first data switching device is a receiver node for the Data I-SID, the multicast manager 140 generates a second control message. This second control message indicates that the first data switching device is a receiver node for the multicast data stream, and this is identified using both the Data I-SID and a nickname of the second data switching device. This second control message is a different type of control message as compared to the first control message. This type difference can either be a different structure or even a different protocol. The second control message is structured such that a Backbone Core Bridge within the transport network uses the second control message for computing a multicast path within the transport network.

In step 430, the first data switching device transmits the second control message to the second data switching device via the transport network. This causes core nodes within the transport network to build a multicast forwarding state to determine paths on which to send the multicast stream.

In step 470, the first data switching device receives data packets corresponding to the multicast data stream.

Figure 5:
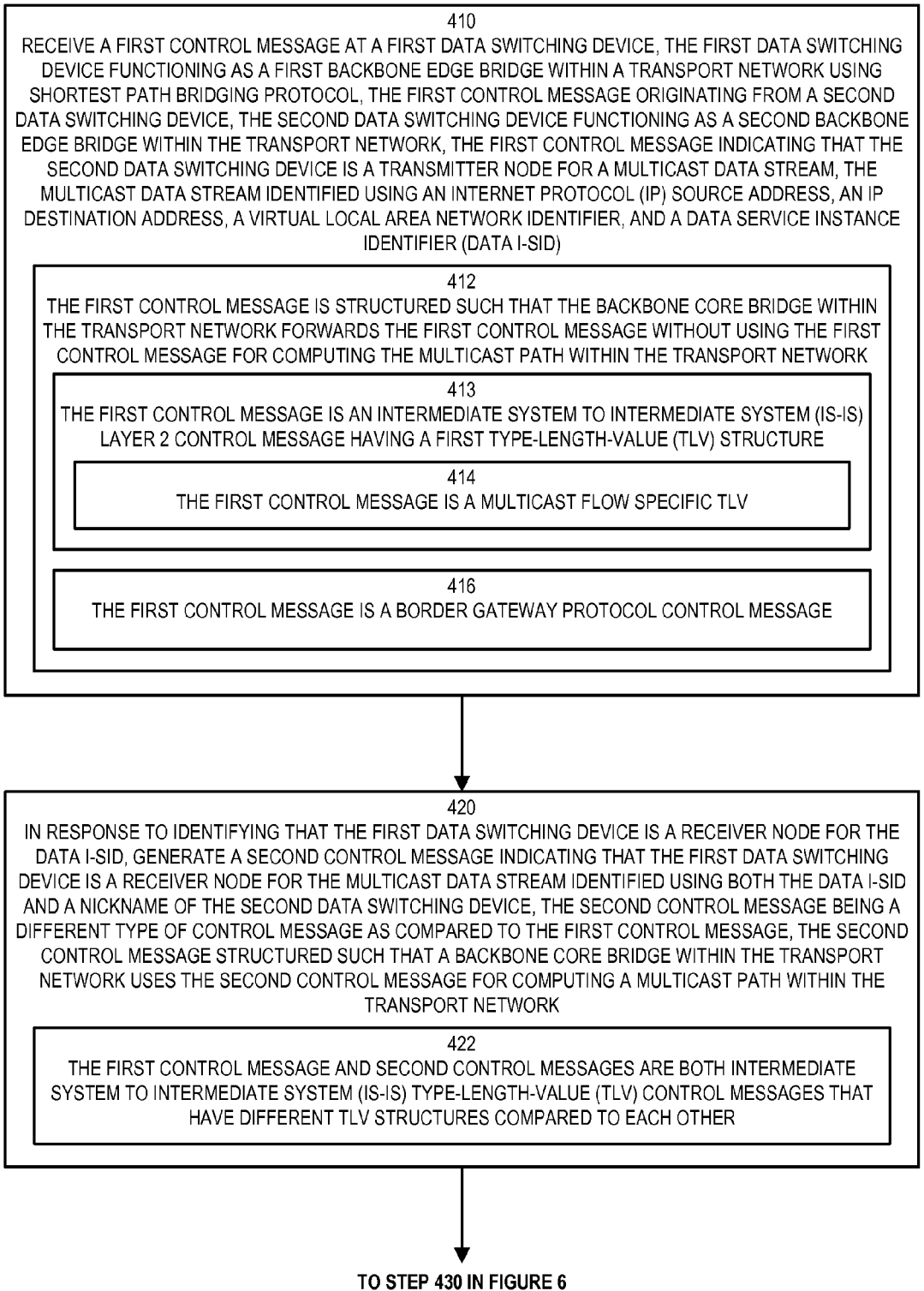
FIGS. 5-6 are a flowchart illustrating an example of a process supporting multicast state creation in an SPB network according to embodiments herein.

FIGS. 5-6 include a flow chart illustrating additional and/or alternative embodiments and optional functionality of the multicast manager 140 as disclosed herein.

In step 410 multicast manager 140 receives a first control message at a first data switching device. The first data switching device is functioning as a first Backbone Edge Bridge within a transport network, and this transport network uses Shortest Path Bridging protocol for forwarding operations. The first control message originates from a second data switching device. This second data switching device functions as a second Backbone Edge Bridge within the transport network. The first control message indicates that the second data switching device is a transmitter node for a multicast data stream. This multicast data stream is identified using an Internet Protocol (IP) Source Address, an IP Destination Address, a Virtual Local Area Network identifier, and a Data Service Instance Identifier (Data I-SID).

In step 412, the first control message is structured such that the Backbone Core Bridge within the transport network forwards the first control message without using the first control message for computing the multicast path within the transport network. In other words, core nodes within the transport network will relay the first control message without attempting to interpret path information. This can be due to the indicated type of control message, or using a protocol that the core nodes cannot interpret, or otherwise.

In step 413, the first control message is an Intermediate System To Intermediate System (IS-IS) Layer 2 control message having a first type-length-value (TLV) structure.

In step 414, the first control message is a Multicast Flow Specific TLV, which is a specific type of control message designed for conveying path computation information, yet core nodes are instructed not to interpret values within this control message for computing paths.

In step 416, the first control message is a Border Gateway Protocol control message.

In step 420, in response to identifying that the first data switching device is a receiver node for the Data I-SID, the multicast manager 140 generates a second control message. This second control message indicates that the first data switching device is a receiver node for the multicast data stream, and this is identified using both the Data I-SID and a nickname of the second data switching device. This second control message is a different type of control message as compared to the first control message.

In step 422, the first control message and second control messages are both Intermediate System To Intermediate System (IS-IS) type-length-value (TLV) control messages that have different TLV structures compared to each other. For example, the first control message can be the Multicast Flow Specific TLV, while the second control message is SPB-MAC Service Identifier and Unicast Address Sub-TLV.

In step 430, the first data switching device transmits the second control message to the second data switching device via the transport network, thereby causing link state databases within the core to be updated.

In step 440, multicast manager 140 receives a third control message at the first data switching device. The third control message originates from a second data switching device. The third control message indicates that the second data switching device is a transmitter node for the multicast data stream identified using the Data I-SID. The third control message is a same type of control message as compared to the second control message. Thus, the third control message is structured such that the Backbone Core Bridge (or Bridges) within the transport network uses the third control message for computing the multicast path within the transport network.

In step 450, the multicast manager 140 updates a link state database used by the first data switching device such that the link state database indicates that the second data switching device is the transmitter node for the Data I-SID.

In step 460, the multicast manager 140 builds a forwarding table used by the first data switching device. Building the forwarding table includes refraining from creating forwarding entries for Data I-SIDs that are not linked to a specific nickname of a given data switching device, thereby enabling multicast within the SPB network.

In step 470, the first data switching device receives data packets corresponding to the multicast data stream.

In another embodiment, multicast manager 140 operates on an ingress edge node creating and processing multicast control messages. This can include several related or complimentary steps. On the ingress edge node, the multicast manager 140 receives, at a first data switching device, a multicast data stream to transmit via a transport network using Shortest Path Bridging (SPB) protocol. The first data switching device functions as a first Backbone Edge Bridge within the transport network. The multicast data stream is an Internet Protocol (IP) multicast data stream having a source and group identification and received from an access network that is logically distinct from the SPB network. The multicast manager 140 dynamically allocates a Data Service Instance Identifier (Data I-SID) that identifies the multicast data stream within the SPB network.

The first data switching device sends a first control message to Backbone Edge Bridges within the transport network. This first control message indicates that the first data switching device is a transmitter node for the multicast data stream. The multicast data stream is identified using an IP Source Address, an IP Destination Address, a Virtual Local Area Network identifier, and the Data I-SID, in that all of these items of information can be included in the first control message.

The first control message can be structured such that the Backbone Core Bridge within the transport network forwards the first control message without using the first control message for computing the multicast path within the transport network. The first control message can be an Intermediate System To Intermediate System (IS-IS) Layer 2 control message having a first type-length-value (TLV) structure, or, alternatively, a Border Gateway Protocol (BGP) control message.

The first data switching device sends a second control message to Backbone Edge Bridges and Backbone Core Bridges within the transport network. The second control message indicating that the first data switching device is the transmitter node for the multicast data stream identified using the Data I-SID. The second control message is a different type of control message as compared to the first control message. The second control message is structured such that a Backbone Core Bridge within the transport network uses the second control message for computing a multicast path within the transport network.

The first data switching device receives a third control message, which originates from a second data switching device. The second data switching device functions as a second Backbone Edge Bridge within the transport network. The third control message indicates that the second data switching device is a receiver node for the multicast data stream identified using both the Data I-SID and a nickname of the first data switching device. The third control message is structured such the Backbone Core Bridge (or Bridges) within the transport network use the Data I-SID and nickname of the first data switching device to compute the multicast data path or multicast forwarding state. The multicast manager 140 can also update a link state database used by the first data switching device such that the link state database indicates that the second data switching device is the receiver node for the Data I-SID. The multicast manager 140 can build a forwarding table used by the first data switching device such that data packets indicating the Data I-SID and also indicating the second data switching device as the receiver node are routed to the second data switching device. Building the forwarding table used by the first data switching device can include refraining from creating multicast forwarding entries for Data I-SIDs that are not linked to a specific nickname of a given data switching device. Thus, only source-specific multicast requests are recorded. The first data switching device can then forward data packets to the second data switching device via the transport network, the data packets indicating the I-SID and indicating the first data switching device as the transmitter node.

Continuing with FIG. 7, the following discussion provides a basic embodiment indicating how to carry out functionality associated with the multicast manager 140 as discussed above. It should be noted, however, that the actual configuration for carrying out the multicast manager 140 can vary depending on a respective application. For example, computer system 149 can include one or multiple computers that carry out the processing as described herein.

In different embodiments, computer system 149 may be any of various types of devices, including, but not limited to, a cell phone, a personal computer system, desktop computer, laptop, notebook, or netbook computer, mainframe computer system, handheld computer, workstation, network computer, router, network switch, bridge, application server, storage device, a consumer electronics device such as a camera, camcorder, set top box, mobile device, video game console, handheld video game device, or in general any type of computing or electronic device.

Computer system 149 is shown connected to display monitor 130 for displaying a graphical user interface 133 for a user 136 to operate using input devices 135. Repository 138 can optionally be used for storing data files and content both before and after processing. Input devices 135 can include one or more devices such as a keyboard, computer mouse, microphone, etc.

As shown, computer system 149 of the present example includes an interconnect 143 that couples a memory system 141, a processor 142, I/O interface 144, and a communications interface 145.

I/O interface 144 provides connectivity to peripheral devices such as input devices 135 including a computer mouse, a keyboard, a selection tool to move a cursor, display screen, etc.

Communications interface 145 enables the multicast manager 140 of computer system 149 to communicate over a network and, if necessary, retrieve any data required to create views, process content, communicate with a user, etc. according to embodiments herein.

As shown, memory system 141 is encoded with multicast manager 140-1 that supports functionality as discussed above and as discussed further below. Multicast manager 140-1 (and/or other resources as described herein) can be embodied as software code such as data and/or logic instructions that support processing functionality according to different embodiments described herein.

During operation of one embodiment, processor 142 accesses memory system 141 via the use of interconnect 143 in order to launch, run, execute, interpret or otherwise perform the logic instructions of the multicast manager 140-1. Execution of the multicast manager 140-1 produces processing functionality in multicast manager process 140-2. In other words, the multicast manager process 140-2 represents one or more portions of the multicast manager 140 performing within or upon the processor 142 in the computer system 149.

It should be noted that, in addition to the multicast manager process 140-2 that carries out method operations as discussed herein, other embodiments herein include the multicast manager 140-1 itself (i.e., the un-executed or non-performing logic instructions and/or data). The multicast manager 140-1 may be stored on a non-transitory, tangible computer-readable storage medium including computer readable storage media such as floppy disk, hard disk, optical medium, etc. According to other embodiments, the multicast manager 140-1 can also be stored in a memory type system such as in firmware, read only memory (ROM), or, as in this example, as executable code within the memory system 141.

In addition to these embodiments, it should also be noted that other embodiments herein include the execution of the multicast manager 140-1 in processor 142 as the multicast manager process 140-2. Thus, those skilled in the art will understand that the computer system 149 can include other processes and/or software and hardware components, such as an operating system that controls allocation and use of hardware resources, or multiple processors.

Those skilled in the art will also understand that there can be many variations made to the operations of the techniques explained above while still achieving the same objectives of the invention. Such variations are intended to be covered by the scope of this invention. As such, the foregoing description of embodiments of the invention are not intended to be limiting. Rather, any limitations to embodiments of the invention are presented in the following claims.

The invention claimed is:

1. A computer-implemented method for packet switching in a Shortest Path Bridging (SPB) network, the computer-implemented method comprising:
    receiving a first control message at a first data switching device, the first data switching device functioning as a first Backbone Edge Bridge within a transport network using Shortest Path Bridging protocol, the first control message originating from a second data switching device, the second data switching device functioning as a second Backbone Edge Bridge within the transport network, the first control message indicating that the second data switching device is a transmitter node for a multicast data stream, the multicast data stream identified using an Internet Protocol (IP) Source Address, an IP Destination Address, a Virtual Local Area Network identifier, and a Data Service Instance Identifier (Data I-SID);
    in response to identifying that the first data switching device is a receiver node for the Data I-SID, generating a second control message indicating that the first data switching device is a receiver node for the multicast data stream identified using both the Data I-SID and a nickname of the second data switching device, the second control message being a different type of control message as compared to the first control message, the second control message structured such that a Backbone Core Bridge within the transport network uses the second control message for computing a multicast path within the transport network;
    transmitting the second control message to the second data switching device via the transport network; and
    receiving, at the first data switching device, data packets corresponding to the multicast data stream; and
    updating a link state database used by the first data switching device such that the link state database indicates that the second data switching device is the transmitter node for the Data I-SID; and
    building a forwarding table used by the first data switching device including refraining from creating forwarding entries for Data I-SIDs that are not linked to a specific nickname of a given data switching device.

2. The computer-implemented method of claim 1, wherein the first control message is structured such that the Backbone Core Bridge within the transport network forwards the first control message without using the first control message for computing the multicast path within the transport network.

3. The computer-implemented method of claim 2, wherein the first control message is an Intermediate System To Intermediate System (IS-IS) Layer 2 control message having a first type-length-value (TLV) structure.

4. The computer-implemented method of claim 3, wherein the first control message is a Multicast Flow Specific TLV.

5. The computer-implemented method of claim 2, wherein the first control message is a Border Gateway Protocol control message.

6. The computer-implemented method of claim 1, wherein the first control message and second control messages are both Intermediate System To Intermediate System (IS-IS) type-length-value (TLV) control messages that have different TLV structures compared to each other.

7. The computer-implemented method of claim 1, further comprising:
   receiving a third control message at the first data switching device, the third control message originating from a second data switching device, the third control message indicating that the second data switching device is a transmitter node for the multicast data stream identified using the Data I-SID, the third control message being a same type of control message as compared to the second control message, the third control message structured such that the Backbone Core Bridge within the transport network uses the third control message for computing the multicast path within the transport network.

8. A system for packet switching in a Shortest Path Bridging (SPB) network, the system comprising:
   a processor; and
   a memory coupled to the processor, the memory storing instructions that, when executed by the processor, cause the system to perform the operations of:
   receiving a first control message at a first data switching device, the first data switching device functioning as a first Backbone Edge Bridge within a transport network using Shortest Path Bridging protocol, the first control message originating from a second data switching device, the second data switching device functioning as a second Backbone Edge Bridge within the transport network, the first control message indicating that the second data switching device is a transmitter node for a multicast data stream, the multicast data stream identified using an Internet Protocol (IP) Source Address, an IP Destination Address, a Virtual Local Area Network identifier, and a Data Service Instance Identifier (Data I-SID);
   in response to identifying that the first data switching device is a receiver node for the Data I-SID, generating a second control message indicating that the first data switching device is a receiver node for the multicast data stream identified using both the Data I-SID and a nickname of the second data switching device, the second control message being a different type of control message as compared to the first control message, the second control message structured such that a Backbone Core Bridge within the transport network uses the second control message for computing a multicast path within the transport network;
   transmitting the second control message to the second data switching device via the transport network; and
   receiving, at the first data switching device, data packets corresponding to the multicast data stream; and
   updating a link state database used by the first data switching device such that the link state database indicates that the second data switching device is the transmitter node for the Data I-SID; and
   building a forwarding table used by the first data switching device including refraining from creating forwarding entries for Data I-SIDs that are not linked to a specific nickname of a given data switching device.

9. The system of claim 8, wherein the first control message is structured such that the Backbone Core Bridge within the transport network forwards the first control message
   without using the first control message for computing the multicast path within the transport network.

10. The system of claim 9, wherein the first control message is an Intermediate System To Intermediate System (IS-IS) Layer 2 control message having a first type-length-value (TLV) structure.

11. The system of claim 9, wherein the first control message is a Border Gateway Protocol control message.

12. The system of claim 8, wherein the first control message and second control messages are both Intermediate System To Intermediate System (IS-IS) type-length-value (TLV) control messages that have different TLV structures compared to each other.

13. The system of claim 8, wherein the memory stores further instructions that, when executed by the processor, cause the system to perform the operations of:
   receiving a third control message at the first data switching device, the third control message originating from a second data switching device, the third control message indicating that the second data switching device is a transmitter node for the multicast data stream identified using the Data I-SID, the third control message being a same type of control message as compared to the second control message, the third control message structured such that the Backbone Core Bridge within the transport network uses the third control message for computing the multicast path within the transport network.

14. A computer-implemented method for packet switching in a Shortest Path Bridging (SPB) network, the computer-implemented method comprising:
   receiving, at a first data switching device, a multicast data stream to transmit via a transport network using Shortest Path Bridging (SPB) protocol, the first data switching device functioning as a first Backbone Edge Bridge within the transport network, the multicast data stream being an Internet Protocol (IP) multicast data stream having a source and group identification and received from an access network that is logically distinct from the SPB network;
   dynamically allocating a Data Service Instance Identifier (Data I-SID) that identifies the multicast data stream within the SPB network;
   sending a first control message to Backbone Edge Bridges within the transport network, the first control message indicating that the first data switching device is a transmitter node for the multicast data stream, the multicast data stream identified using an IP Source Address, an IP Destination Address, a Virtual Local Area Network identifier, and the Data I-SID;
   sending a second control message to Backbone Edge Bridges within the transport network, the second control message indicating that the first data switching device is the transmitter node for the multicast data stream identified using the Data I-SID, the second control message being a different type of control message as compared to the first control message, the second control message structured such that a Backbone Core Bridge within the transport network uses the second control message for computing a multicast path within the transport network;
   receiving, at the first data switching device, a third control message originating from a second data switching device, the second data switching device functioning as a second Backbone Edge Bridge within the transport network, the third control message indicating that the second data switching device is a receiver node for the multicast data stream identified using both the Data I-SID and a nickname of the first data switching device, the third control message structured such the Backbone Core Bridge within the transport network use the Data I-SID and nickname of the first data switching device to compute the multicast data path; and forwarding data packets to the second data switching device via the transport network, the data packets indicating the I-SID and indicating the first data switching device as the transmitter node; and updating a link state database used by the first data switching device such that the link state database indicates that the second data switching device is the transmitter node for the Data I-SID; and building a forwarding table used by the first data switching device including refraining from creating forwarding entries for Data I-SIDS that are not linked to a specific nickname of a given data switching device.

15. The computer-implemented method of claim 14, wherein the first control message is structured such that the Backbone Core Bridge within the transport network forwards the first control message without using the first control message for computing the multicast path within the transport network.

16. The computer-implemented method of claim 15, wherein the first control message is an Intermediate System To Intermediate System (IS-IS) Layer 2 control message having a first type-length-value (TLV) structure.

17. The computer-implemented method of claim 15, wherein the first control message is a Border Gateway Protocol control message.

18. The computer-implemented method of claim 14, further comprising:

updating the forwarding table used by the first data switching device such that data packets indicating the Data I-SID and also indicating the second data switching device as the receiver node are routed to the second data switching device.

* * * * *